(12) United States Patent
Desineni (10) Patent No.: US 8,077,745 B2
(45) Date of Patent: Dec. 13, 2011

(54) TECHNIQUES FOR UNIDIRECTIONAL DISABLING OF AUDIO-VIDEO SYNCHRONIZATION

(75) Inventor: Harikishan Desineni, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 613 days.

(21) Appl. No.: 12/042,876

(22) Filed: Mar. 5, 2008

(65) Prior Publication Data

US 2008/0232768 A1 Sep. 25, 2008

Related U.S. Application Data

(60) Provisional application No. 60/896,806, filed on Mar. 23, 2007.

(51) Int. Cl.
H04J 3/06 (2006.01)
G06F 15/16 (2006.01)

(52) U.S. Cl. .................. 370/503; 709/228; 709/248

(58) Field of Classification Search .................. None
See application file for complete search history.

(56) References Cited

U.S. PATENT DOCUMENTS

| 5,570,372 | A | * | 10/1996 | Shaffer | 370/468 |
|---|---|---|---|---|---|
| 5,854,876 | A | | 12/1998 | Kim | |
| 6,480,902 | B1 | * | 11/2002 | Yuang et al. | 709/248 |
| 2004/0013093 | A1 | | 1/2004 | Eder et al. | |
| 2005/0195860 | A1 | | 9/2005 | Ollis et al. | |
| 2005/0237952 | A1 | * | 10/2005 | Punj et al. | 370/260 |
| 2007/0025325 | A1 | * | 2/2007 | Kumar | 370/350 |
| 2007/0047590 | A1 | * | 3/2007 | Curcio et al. | 370/503 |

FOREIGN PATENT DOCUMENTS

| JP | 2004282667 A | 10/2004 |
|---|---|---|
| RU | 2159510 C2 | 11/2000 |
| RU | 2003129661 | 3/2005 |
| RU | 2273111 C2 | 3/2006 |
| WO | WO03039142 A1 | 5/2003 |

OTHER PUBLICATIONS

Anonymous: "Technical Specification Group Services and System Aspects; IP Multimedia Subsystem (IMS), Multimedia Telephony; Media handling and interaction (Release 7): 3GPP TS 26.114 V2.0.0" 3GPP Technical Specification, [Online], Mar. 19, 2007.*

(Continued)

Primary Examiner — Ayaz R Sheikh
Assistant Examiner — Timothy J Weidner
(74) Attorney, Agent, or Firm — Kevin T. Chentham (57) ABSTRACT

This disclosure describes techniques to allow for unidirectional disabling of audio-video synchronization. In particular, a synchronization command is defined for packet-based network protocols. The synchronization command can disable audio-video synchronization in a sending direction, a receiving direction, or both the sending and receiving direction. In this way, devices are given more control over audio-video synchronization, and can disable such synchronization in a unidirectional manner only, while maintaining synchronization in the opposite direction.

29 Claims, 4 Drawing Sheets

D1 → OFFER → D2 m=audio 7000 RTP/AVP 100
a=rtpmap:100evrcb0/8000
m=video 6000 RTP/AVP 98
a=3gpp_sync_info:No Sync:send

D1 ← ANSWER ← D2 m=audio 8000 RTP/AVP 100
a=rtpmap:100evrcb0/8000
m=video 7000 RTP/AVP 98
a=3gpp_sync_info:No Sync:recv

OTHER PUBLICATIONS

Anonymous: "Technical Specification Group Services and System Aspects; IP Multimedia Subsystem (IMS), Multimedia Telephony; Media handling and interaction (Release 7): 3GPP TS 26.114 V1.0.0" 3GPP Technical Specification, [Online], Dec. 11, 2006.*

International Search Report—PCT/US08/057923—International Search Authority, European Patent Office—Jul. 28, 2008.

Written Opinion—PCT/US08/057923—International Search Authority, European Patent Office—Jul. 28, 2008.

Anonymous: "Technical Specification Group Services and System Aspects; IP Multimedia Subsystem (IMS), Multimedia Telephony; Media handling and interaction (Release 7): 3GPP TS 26.114 V2.0.0," 3GPP Technical Specification, [Online], Mar. 19, 2007.

Anonymous: "3GPP Specification Detail; TS 26.114;"Jul. 7, 2008, pp. 1-2.

Levin. O, et al., "SIP Requirements for support of Multimedia and Video", Feb. 22, 2001, pp. 1-9, retrieved from the Internet: URL: htpp://tools.ietf.org/html/draft-levin-sip-for-video-00.

* cited by examiner

TECHNIQUES FOR UNIDIRECTIONAL DISABLING OF AUDIO-VIDEO SYNCHRONIZATION

This disclosure claims the benefit of U.S. Provisional Application No. 60/896,806, filed on Mar. 23, 2007, the entire content of which is incorporated herein by reference.

TECHNICAL FIELD

This disclosure relates to packet-based communication of audio and video information and, more particularly, techniques for disabling audio and video synchronization.

BACKGROUND

Packet-based communication according to the internet protocol (IP) is used for a wide variety of telecommunication applications. In many telecommunication applications, audio coding is used along with video coding in order to provide multimedia (i.e., audio-video) content that can be communicated between devices. Examples of applications that code audio and video information include video telephony (VT), video conferencing, and streaming video applications, to name a few. The audio and video information may be segmented into frames or packets, which comprise blocks of audio and video data. The information can be encoded, and then transmitted from an encoding device to a decoding device via packet-based IP communication. The decoding device decodes and assembles the audio and video information to create audio and video output.

In many network protocols, time stamps are used with the audio and video information in order to allow for synchronization of the information at the decoding device. In VT applications, for example, the video information may be synchronized with the audio information at the decoding device in order to ensure that the audio and video information is presented to the user in unison. As one example, it is desirable that audible speech be synchronized to movement of a speaker's mouth. Likewise, it may be intended that particular video content be viewed in conjunction with specific audio. In some specifications, such as 3GPP TS26.114 (the third generation partnership project technical specification 26.114), signaling is provisioned to allow disabling of multi-media synchronization altogether. In this case, audio information and video information are not synchronized for any communication between devices, e.g., the audio and video synchronization is disabled in both directions of a bi-directional communication.

SUMMARY

In general, this disclosure describes techniques for unidirectional disabling of audio-video synchronization. In particular, a synchronization command is defined for packet-based network protocols. The synchronization command can disable audio-video synchronization in a sending direction, a receiving direction, or both the sending and receiving directions. In this way, devices are given more control over audio-video synchronization, and can disable such synchronization in a unidirectional manner (i.e., in one direction only) while maintaining synchronization in the opposite direction.

For example, in voice-over-IP (VOIP) applications that support video telephony (VT), the default network configuration may define video synchronization with the audio. In this case, time stamps associated with the video information may be used to properly synchronize the video information with the audio information at the decoding device. In some cases, however, it may be desirable to allow a device to send an alternative video clip, while maintaining audio communication in the send path. Furthermore, it may be desirable to allow for audio-video VT in the receive path, even if an alternative video clip is being transmitted in the send path. In these and other cases, it may be desirable to disable audio-video synchronization in the send path, while maintaining audio-video synchronization in the receive path. For such bi-lateral audio-video communications, the techniques of this disclosure allow the devices to send and receive commands to instruct the other device to either send or receive unsynchronized audio and video information. At the same time, however, audio-video synchronization may be maintained for communications in the opposite direction relative to the direction that has synchronization disabled.

In one example, this disclosure provides a method comprising generating a command to disable synchronization of video information and audio information in only one direction of a bi-directional communication, and sending the command to a device.

In another example, this disclosure provides a method comprising receiving from a device a command to disable synchronization of video information and audio information in only one direction of a bi-directional communication, and disabling synchronization of video information and audio information in the one direction in response to receiving the command.

In another example, this disclosure provides a device comprising a control unit that generates a command to disable synchronization of video information and audio information in only one direction of a bi-directional communication, and a transmitter that sends the command to another device.

In another example, this disclosure provides a device comprising a receiver that receives a command to disable synchronization of video information and audio information in only one direction of a bi-directional communication, and a control unit that disables synchronization of video information and audio information in the one direction in response to receiving the command.

In another example, this disclosure provides a system comprising a packet-based network, a first device coupled to the packet-based network, and a second device coupled to the packet-based network, wherein the first device and the second device are communicatively coupled to one another for bi-directional communication through the packet based network. The first device generates a command to disable synchronization of video information and audio information in one direction of the bi-directional communication, and sends the command to a second device, and the second device receives the command, and disables synchronization of video information and audio information in the one direction in response to receiving the command.

The techniques described in this disclosure may be implemented in hardware, software, firmware, or any combination thereof. If implemented in software, the software may be executed in a digital signal processor (DSP) or other type of processor. The software that executes the techniques may be initially stored in a machine-readable medium and loaded and executed in the processor.

Accordingly, this disclosure also contemplates a computer readable medium comprising instructions that upon execution in a device cause the device to perform any of the techniques described herein. In some cases, the computer readable medium may be included in a computer program product, which may include packaging materials. Furthermore, if implemented in hardware, the techniques of this disclosure may be directed to a circuit or other hardware apparatus that performs any of the techniques described herein.

Additional details of various aspects and examples of the techniques described in this disclosure are set forth in the accompanying drawings and the description below. Other features, objects and advantages of the techniques described herein will become apparent from the description and drawings, and from the claims.

DETAILED DESCRIPTION

This disclosure describes techniques to allow for unidirectional disabling of audio-video synchronization. In particular, this disclosure proposes a synchronization command that may be used for devices that communicate via packet-based network protocols. The synchronization command can disable audio-video synchronization in a unidirectional manner. In particular, the synchronization command can disable audio-video synchronization in a sending direction, a receiving direction, or both the sending and receiving direction. Devices can send and receive the commands to facilitate control over audio-video synchronization. In particular, devices can send and receive the commands to disable synchronization in only one direction of communication, while maintaining synchronization in the opposite direction of communication.

In many network protocols, time stamps are used for the audio and video information in order to allow for synchronization of the information at the decoding device. In packet-based video telephony (VT) applications, for example, the video information may be synchronized with the audio information at the decoding device in order to ensure that the audio information and video information are presented to the user in unison. Such synchronization is typically the default setting for devices in the network. As one example, it is often desirable that audible speech be synchronized to movement of a speaker's mouth in VT application. Likewise, it may be intended that particular video content be viewed in conjunction with specific audio.

In some specifications, such as 3GPP TS26.114 (the third generation partnership project technical specification 26.114), signaling is provisioned to allow disabling of multimedia synchronization altogether. In this case, signaling can disable synchronization for all communication between devices, e.g., the audio and video information in both directions of a bi-directional communication. The signaling provisioned by 3GPP TS26.114, however, lacks an ability to disable synchronization in only one direction, while maintaining synchronization in the opposite direction.

As an example, voice-over-IP (VOIP) applications that support VT may have default network configurations that define video synchronization with the audio. In this case, time stamps associated with the video information may be used to properly synchronize the video information with the audio information at the decoding device. In some cases, however, it may be desirable to allow a device to send a video clip, while maintaining audio communication in the send path. In this case, the video information is unrelated to the audio information, and should not be synchronized. Furthermore, it may also be desirable to allow for full audio-video VT in the receive path, even if an alternative video clip is being transmitted in the send path. In these and other cases, it may be desirable to disable audio-video synchronization in the send path, while maintaining audio-video synchronization in the receive path. For such bi-lateral audio-video communications, the techniques of this disclosure allow the devices to send and receive commands to instruct the other device to either send or receive unsynchronized audio and video information. At the same time, however, audio-video synchronization may be maintained for communications in the opposite direction relative to the direction that has synchronization disabled.

Figure 1:
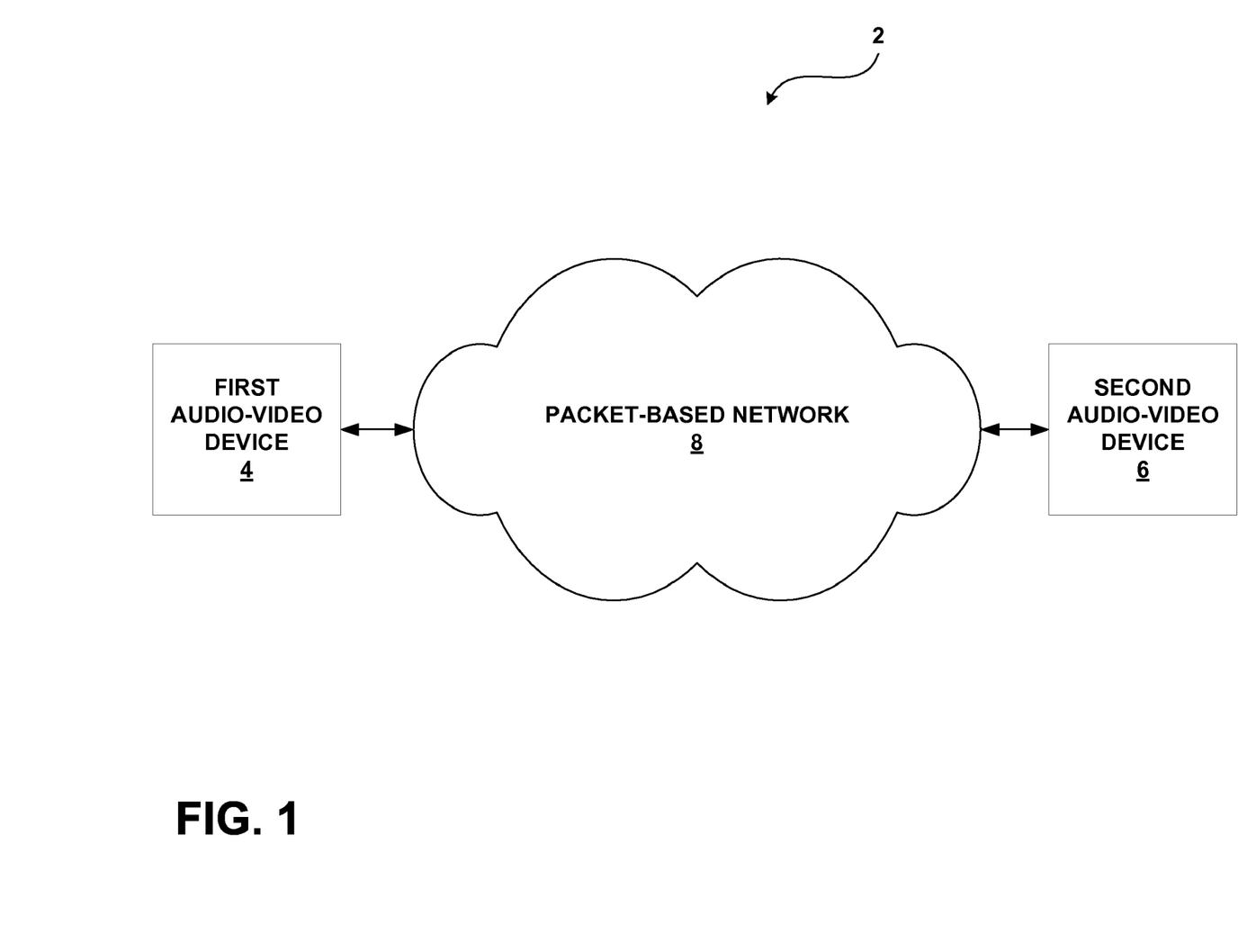
FIG. 1 is a block diagram illustrating a system that may implement techniques for unidirectional disabling of audio-video synchronization.

FIG. 1 is a block diagram illustrating a system 2 that may use the techniques described herein. As shown in FIG. 1, system 2 includes a first audio-video device 4, a second audio-video device 6, and a packet-based network 8. First audio-video device 4 and second audio-video device 6 are both coupled to packet-based network 8. In this way, first audio-video device 4 and second audio-video device 6 are communicatively coupled to one another for bi-directional communication through packet-based network 8.

First audio-video device 4 and second audio-video device 6 may include reciprocal components to support two-way communication of audio-video information. The communication link between first audio-video device 4 and second audio-video device 6 may include wired or wireless channels or possibly a combination of wired and wireless channels.

First audio-video device 4 and second audio-video device 6 may be implemented to include one or more processors, digital signal processors (DSPs), application specific integrated circuits (ASICs), field programmable gate arrays (FPGAs), discrete logic, software, hardware, firmware, or any combinations thereof. Examples of first audio-video device 4 and second audio-video device 6 may include digital televisions, laptop computers or desktop computers, digital music and video devices, video gaming devices, and wireless communication devices such as cellular, satellite or terrestrial-based radiotelephones, and personal digital assistants (PDAs).

In an exemplary embodiment, first and second devices 4, 6 each comprise wireless communication devices, e.g., handsets commonly referred to as cellular telephones. In this case, first and second devices 4, 6 may support VT applications in which audio and video information is transmitted between devices 4, 6. The default setting for such VT applications may define synchronization of video information with audio information in both paths of communication. For purposes of explanation, communications from first audio-video device 4 to second audio-video device 6 may be referred to as forward communications, while communications from second audio-video device 6 to first audio-video device 4 may be referred to as reverse communications. Of course, these directions could be reversed.

The components described herein are exemplary of those applicable to implementation of the techniques described herein, although first audio-video device 4 and second audio-video device 6 may include many other components, if desired. Moreover, the techniques of this disclosure are not necessarily limited to use in a system like that of system 2. The techniques may find application in any audio-video coding environment in which the video information is synchronized with the audio information.

In general, first audio-video device 4 generates a command to disable synchronization of video information and audio information in only one direction of a bi-directional communication with second audio-video device 6. First audio-video device 4 sends the command to second audio-video device 6. Second audio-video device 6 receives the command to disable synchronization of video information and audio information in only one direction of the bi-directional communication. In response to receiving the command, second audio-video device 6 disables synchronization of video information and audio information in the one direction. Second audio-video device 6 may send an acknowledgement of the command to first audio-video device 4 to indicate that synchronization of video information and audio information is disabled in the one direction. First audio-video device 4 receives the acknowledgement of the command from second audio-video device 6, and in response to the acknowledgement, first audio-video device 4 disables synchronization of video information and audio information in the one direction.

In one example, the command disables synchronization of video and audio information in a forward direction of communication, e.g., from first audio-video device 4 to second audio-video device 6. In this case, first audio-video device 4 sends first audio information and first video information to second audio-video device 6 and synchronization is disabled for the first audio information and the first video information. The first audio information may comprise first voice information associated with a first user at first audio-video device 4, and the first video information may comprise a video clip unrelated to the first audio information. First audio-video device 4 then receives second audio information and second video information from second audio-video device 6, wherein synchronization is enabled for the second audio information and the second video information. The second audio information may comprise second voice information associated with a second user at second audio-video device 6, and the second video information may comprise video associated with the second audio information.

In another example, the command disables synchronization of video and audio information in a reverse direction of communication, e.g., from second audio-video device 6 to first audio-video device 4. In this case, first audio-video device 4 sends first audio information and first video information to second audio-video device 6, wherein synchronization is enabled for the first audio information and the first video information. The first audio information comprises first voice information associated with a first user at first audio-video device 4, and the first video information comprises video associated with the first audio information. First audio-video device 4 receives second audio information and second video information from second audio-video device 6, wherein synchronization is disabled for the second audio information and the second video information. The second audio information may comprise second voice information associated with a second user at second audio-video device 6, and the second video information comprises a video clip unrelated to the second audio information.

In one exemplary implementation, the command to disable synchronization in one direction comprises a synchronization attribute command in a third generation partnership project technical specification 26.114 (3GPP TS26.114) protocol. In this case, the command may comprise a session description protocol (SDP) update within a bi-directional video stream that indicates that video information in the sending direction, the receiving direction, or both the sending and receiving direction should not be synchronized with audio information. First and second devices 4, 6 can be programmed to understand the command, and disable synchronization in the manner specified by the command. Again, this includes the ability to disable synchronization in only a unidirectional manner.

Figure 2:
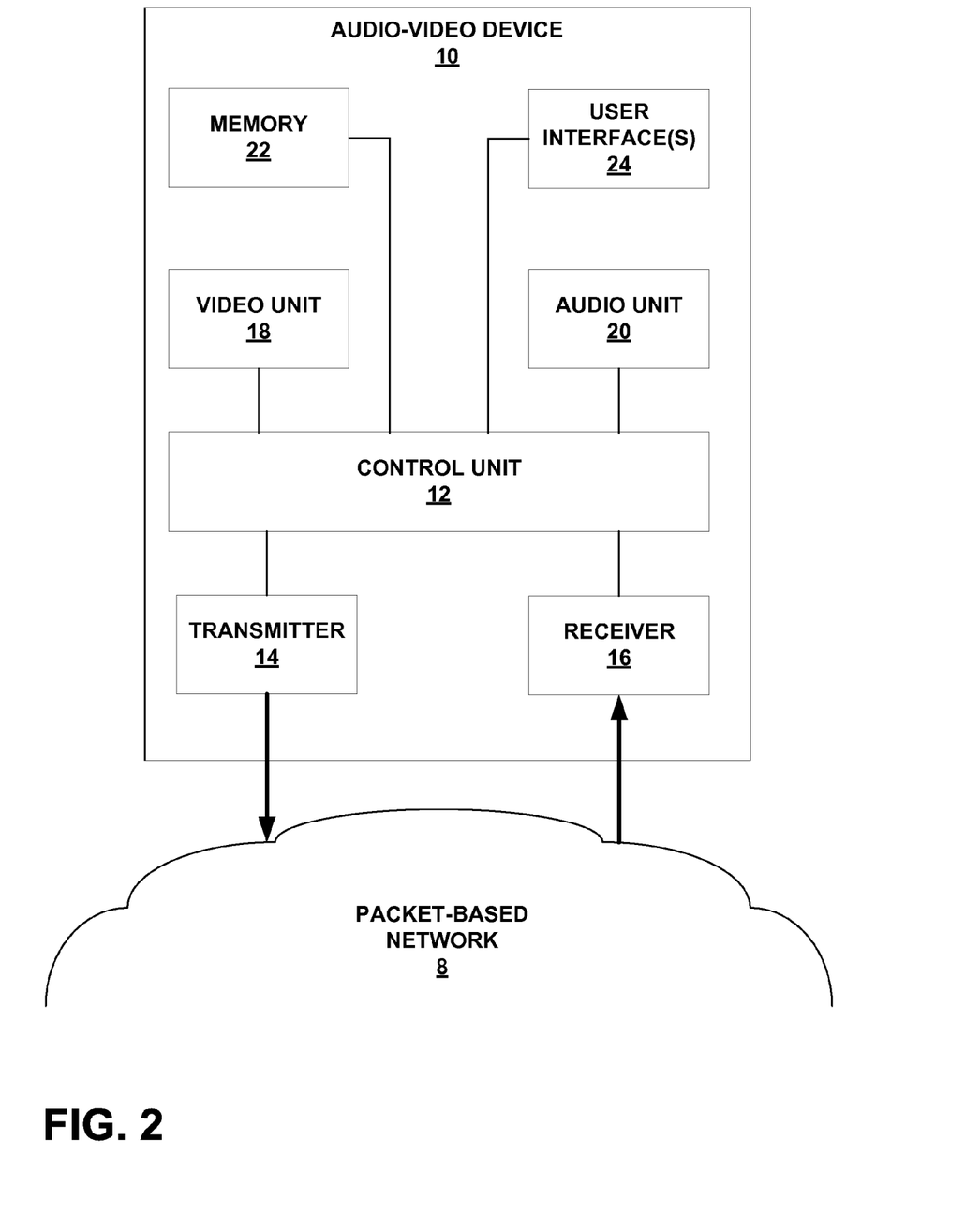
FIG. 2 is block diagram of a device that may implement techniques for unidirectional disabling of audio-video synchronization.

FIG. 2 is block diagram of an exemplary audio-video device 10, which may correspond to either first audio-video device 4 or second audio-video device 6 of FIG. 1. Device 10 sends and receives communications with another device through packet-based network 8. The communications may include both audio and video information. Transmitter 14 sends such audio-video information, and receiver 16 receives such audio-video information. In some implementations, transmitter 14 and receiver 16 could be integrated into a common transceiver.

Control unit 12 facilitates control and data transfer within audio-video device 10. Device 10 includes a video unit 18, which may comprise a video CODEC (encoder-decoder) to facilitate encoding and decoding of video information. Device 10 also includes an audio unit 20, which may comprise an audio CODEC to facilitate encoding and decoding of audio information. In some cases, video unit 18 and audio unit 20 may be integrated into a common audio-video CODEC. Video information may be synchronized with audio information as a default setting. In this case, video unit 18 synchronizes any decoded video information with decoded audio information from audio unit 20, e.g., based on time stamps of the video and audio information. Memory 22 stores the encoded and decoded information. User interface(s) 24 may facilitate interaction with a user, and may include display screens, touch screens, keypads, scroll bars, scroll wheels, or any other unit that can present output or receive input from a user. The various components illustrated in FIG. 2 may be implemented at least in part as one or more processors, DSPs, ASICs, FPGAs, discrete logic, software, hardware, firmware, or any combinations thereof. If implemented in software, executable instructions may be stored in memory 22, and loaded into control unit 12 (or other units of device 10) for execution.

In accordance with this disclosure, device 10 generates a command to disable synchronization of video information and audio information in only one direction of a bi-directional communication with another device. In particular, control unit 12 generates the command, and causes transmitter 14 to send the command to another device (not shown in FIG. 2) via packet-based network 8. Receiver 16 may receive an acknowledgement of the command from the other device, and in response to the acknowledgement, device 10 disables synchronization of video information and audio information in the one direction.

In another example, device 10 may receive the command to disable synchronization of video information and audio information in one direction of the bi-directional communication. In this case, device 10 receives the command from another device (not shown in FIG. 2), which may be coupled to device 10 via packet-based network 8. In response to receiving the command, device 10 disables synchronization of video information and audio information in the one direction. In this case, device 10 may send an acknowledgement of the command to the other device via packet-based network 8 to indicate that synchronization of video information and audio information is disabled in the one direction.

The command may disable synchronization of video and audio information in a forward direction of communication, e.g., from device 10 to another device coupled to packet-based network 8, or in a reverse direction, e.g., from the other device to device 10. In forward direction case, transmitter 14 of device 10 sends audio information and video information to another device and synchronization is disabled for the audio information and the video information. In the reverse direction case, receiver 16 of audio-video device 10 receives audio information and video information from another device, wherein synchronization is disabled for the audio information and the video information. When synchronization is disabled, video unit 18 decodes the video information without synchronizing the video information with audio information. User interface(s) 24 present the video information without synchronization with the audio information decoded by audio unit 20.

Figure 3:
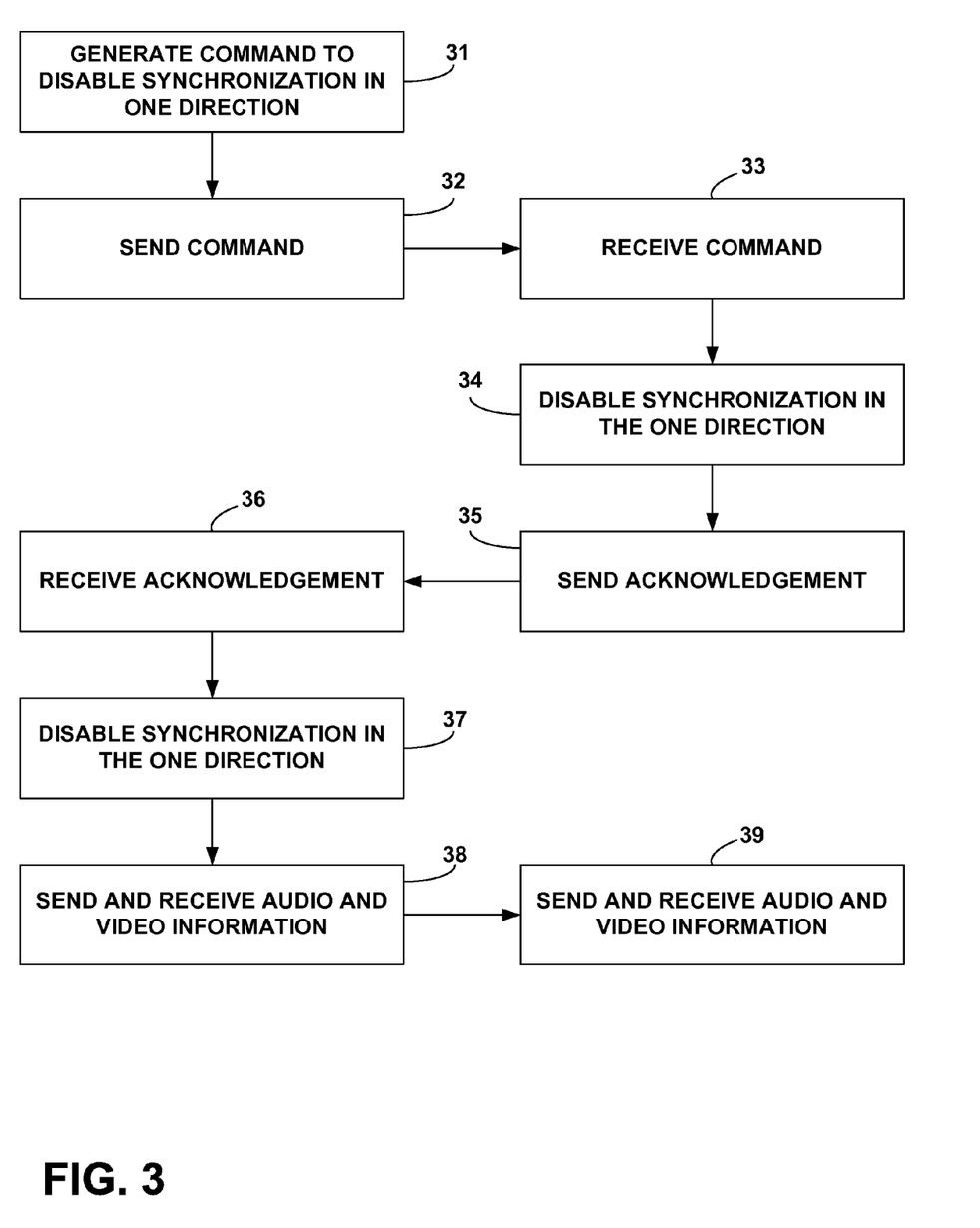
FIG. 3 is a flow diagram illustrating a technique in which audio-video synchronization is disabled in a unidirectional manner.

FIG. 3 is a flow diagram illustrating a technique in which audio-video synchronization is disabled in a unidirectional manner. As shown in FIG. 3, first audio-video device 4 generates a command to disable synchronization in one direction (31), and first audio-video device 4 sends the command to second audio-video device 6 (32). Second audio-video device 6 receives the command (33), and disables synchronization in the one direction in response to the command (34). Second audio-video device 6 also sends an acknowledgement (35) to first audio-video device 4.

First audio-video device 4 receives the acknowledgement (36), and disables synchronization in the one direction (37) in response to the acknowledgement. First audio-video device 4 sends and receives audio information to and from second audio-video device 6 (38), and second audio-video device 6 sends and receives audio information to and from first audio-video device 4 (39). At this point, audio-video synchronization is disabled in either the forward or reverse direction of the bi-lateral communication between audio-video device 4 and 6. That is to say, audio-video synchronization is disabled in one direction of the bi-lateral communication, but remains enabled in the opposite direction of the bi-lateral communication.

Figure 4:
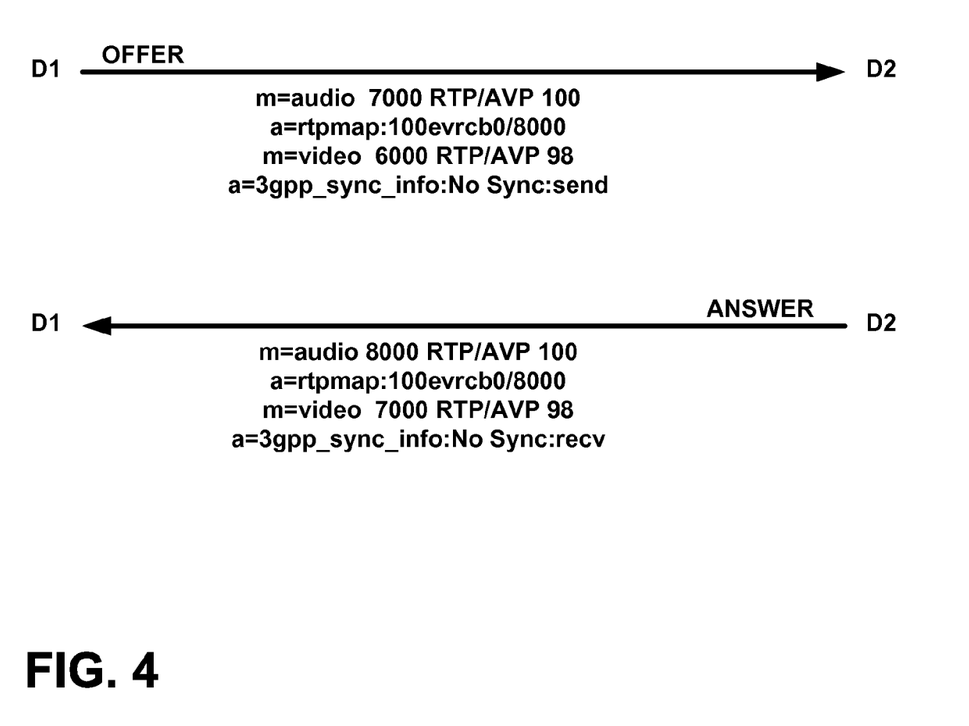
FIG. 4 is a timing diagram illustrating a technique in which audio-video synchronization is disabled in a unidirectional manner.

FIG. 4 is a timing diagram illustrating a technique in which audio-video synchronization is disabled in a unidirectional manner. D1 and D2 represent first and second devices respectively. D1 may correspond to device 4 of FIG. 1 and D2 may correspond to device 6 of FIG. 1. As shown in FIG. 4, D1 sends an offer to D2. The offer specifies that m=audio 7000 RTP/AVP 100. This means that D1 wants D2 to send audio information having a real time transport protocol/audio video profile (RTP/AVP) of 100 to port 7000 of device D1. RTP/AVP 100 specifies the payload type of the audio communication. The offer also specifies that a=rtpmap:100 evrcb0/8000, which provides a mapping of information and identifies an audio CODEC to be used. In particular, "evrcb0/8000" signals that the CODEC "evrcb" should be used with a sampling frequency of 8000. The "0" in "evrcb0" signals a specific packetization mode of speech frames produced by the evrcb CODEC. The parameter "rtpmap" maps the payload type 100 (from "m=audio 7000 RTP/AVP 100) to evrcb0/8000. The actual packet carries the payload type 100, which can be interpreted by D2 as an identification of evrcb0/8000.

The offer also specifies that m=video 6000 RTP/AVP 98. This means that D1 wants D2 to send video information having an RTP/AVP of 98 to port 6000 of device D1. RTP/AVP 98 specifies the payload type of the video communication. The offer also specifies that a=3gpp_sync_info:No Sync:send. This command (a=3gpp_sync_info:No Sync:send) is one example of a command that disables synchronization in a unidirectional manner. In this case, D1 has requested D2 to disable synchronization in the sending direction from D1 to D2. Alternatively, D1 could send a command (a=3gpp_sync_info:No Sync:recv) to disable synchronization in the receive direction from D2 to D1, or a command (a=3gpp_sync_info:No Sync:send and recv) to disable synchronization in both the sending and receive directions.

Upon receiving the offer from D1, D2 sends an answer, which acknowledges the offer. The answer specifies that m=audio 8000 RTP/AVP 100. This means that D2 wants D1 to send audio information having an RTP/AVP of 100 to port 8000 of device D2. Again, RTP/AVP 100 specifies the payload type of the audio communication. The answer also specifies that a=rtpmap:100 evrcb0/8000, which provides a mapping of information and identifies an audio CODEC to be used. Again, "evrcb0/8000" signals that the CODEC "evrcb" should be used with a sampling frequency of 8000, and the "0" in "evrcb0" signals a specific packetization mode of speech frames produced by the evrcb CODEC. The parameter "rtpmap" maps the payload type 100 (from "m=audio 8000 RTP/AVP 100) to evrcb0/8000.

The answer also specifies that m=video 7000 RTP/AVP 98. This means that D2 wants D1 to send video information having an RTP/AVP of 98 to port 7000 of device D2. Again, RTP/AVP 98 specifies the payload type of the video communication. The answer also specifies that a=3gpp_sync_info: No Sync:recv. This command acknowledges that D2 will disable synchronization in the sending direction from D1 to D2.

The commands described in this disclosure can facilitate unidirectional disabling of audio-video synchronization. In particular, the synchronization command can disable audio-video synchronization in a sending direction, a receiving direction, or both the sending and receiving direction. Devices D1 and D2 can send and receive the commands to facilitate control over audio-video synchronization. In this way, devices D1 and D2 can send and receive the commands to disable synchronization in one direction of communication, while maintaining synchronization in the opposite direction of communication.

A number of techniques and examples have been described. The described techniques may be implemented in hardware, software, firmware, or any combination thereof. If implemented in software, the techniques described herein may be embodied in a computer readable medium comprising instructions that upon execution in a device to perform one or more of the techniques described above. For example, the instructions, upon execution, may cause the device to generate a command to disable synchronization of video information and audio information in only one direction of a bi-directional communication, and send the command to another device. Also, the instructions, upon execution, may cause the device to receive from another device a command to disable synchronization of video information and audio information in only one direction of a bi-directional communication, and disable synchronization of video information and audio information in the one direction in response to receiving the command. In some cases, the computer readable medium may be included in a computer program product, which may include packaging materials.

The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The instructions may be executed by one or more processors or other machines, such as one or more DSPs, general purpose microprocessors, one or more ASICs, one or more FPGAs, or other equivalent integrated or discrete logic circuitry. In some embodiments, the functionality described herein may be provided within dedicated software modules or hardware units.

Furthermore, in some cases, the techniques of this disclosure may be implemented in hardware, in which case this disclosure may be directed to a circuit, such as an integrated circuit, ASIC, FPGA, or the like. The circuit may cause the device to generate a command to disable synchronization of video information and audio information in only one direction of a bi-directional communication, and send the command to another device. Also, the circuit may cause the device to receive from another device a command to disable synchronization of video information and audio information in only one direction of a bi-directional communication, and disable synchronization of video information and audio information in the one direction in response to receiving the command.

Although the techniques described above have been primarily described in the context of a bi-directional communication between two devices, the techniques of this disclosure may apply to scenarios where a given device has bi-directional communication with multiple devices. In this case, the given device that generates and sends the command may send the command to multiple devices, all of which have a bi-directional communication with the given device. Each of the different devices that receive the command may disable synchronization in only one direction of the bi-directional communication, and acknowledge the command to the sending device as described herein.

These and other examples are within the scope of the following claims.

The invention claimed is:

1. A method comprising the steps of:
generating a command to disable synchronization of video information and audio information in only one direction of a bi-directional communication;
sending the command to a device;
sending first audio information and first video information to the device, wherein synchronization is disabled for the first audio information and the first video information; and
receiving second audio information and second video information from the device, wherein synchronization is enabled for the second audio information and the second video information.

2. The method of claim 1, further comprising the step of receiving an acknowledgement of the command from the device indicating that the device has disabled synchronization of video information and audio information in the one direction.

3. The method of claim 1, wherein the one direction comprises a direction of communication to the device.

4. The method of claim 3, wherein:
the first audio information comprises first voice information associated with a first user;
the first video information comprises a video clip unrelated to the first audio information;
the second audio information comprises second voice information associated with a second user; and
the second video information comprises video associated with the second audio information.

5. The method of claim 1, wherein the command comprises a synchronization attribute command in a protocol substantially conforming to a third generation partnership project technical specification 26.114 (3GPP TS26.114).

6. A method comprising the steps of:
generating a command to disable synchronization of video information and audio information in only one direction of a bi-directional communication;
sending the command to a device;
sending first audio information and first video information to the device, wherein synchronization is enabled for the first audio information and the first video information; and
receiving second audio information and second video information from the device, wherein synchronization is disabled for the second audio information and the second video information.

7. The method of claim 6, wherein:
the first audio information comprises first voice information associated with a first user;
the first video information comprises video associated with the first audio information;
the second audio information comprises second voice information associated with a second user; and
the second video information comprises a video clip unrelated to the second audio information.

8. A method comprising the steps of:
receiving from a device a command to disable synchronization of video information and audio information in only one direction of a bi-directional communication;
disabling synchronization of video information and audio information in the one direction in response to receiving the command;
sending first audio information and first video information to the device, wherein synchronization is disabled for the first audio information and the first video information; and
receiving second audio information and second video information from the device, wherein synchronization is enabled for the second audio information and the second video information.

9. The method of claim 8, further comprising the step of sending an acknowledgement of the command to the device to indicate that synchronization of video information and audio information is disabled in the one direction.

10. The method of claim 8, wherein the one direction comprises a direction of communication to the device.

11. The method of claim 10, wherein:
the first audio information comprises first voice information associated with a first user;
the first video information comprises a video clip unrelated to the first audio information;
the second audio information comprises second voice information associated with a second user; and
the second video information comprises video associated with the second audio information.

12. The method of claim 8, wherein the command comprises a synchronization attribute command in a protocol substantially conforming to a third generation partnership project technical specification 26.114 (3GPP TS26.114).

13. A method comprising the steps of:
receiving from a device a command to disable synchronization of video information and audio information in only one direction of a bi-directional communication;
disabling synchronization of video information and audio information in the one direction in response to receiving the command;
sending first audio information and first video information to the device, wherein synchronization is enabled for the first audio information and the first video information; and receiving second audio information and second video information from the device, wherein synchronization is disabled for the second audio information and the second video information.

14. The method of claim 13, wherein:
the first audio information comprises first voice information associated with a first user;
the first video information comprises video associated with the first audio information;
the second audio information comprises second voice information associated with a second user; and
the second video information comprises a video clip unrelated to the second audio information.

15. A device for communicating audio and video information, comprising:
a control unit that generates a command to disable synchronization of video information and audio information in only one direction of a bi-directional communication;
a transmitter that:
sends the command to another device;
sends first audio information and first video information to the another device, wherein synchronization is disabled for the first audio information and the first video information; and
a receiver that receives second audio information and second video information from the another device, wherein synchronization is enabled for the second audio information and the second video information.

16. The device of claim 15, wherein the receiver further receives an acknowledgement of the command from the another device indicating that the another device has disabled synchronization of video information and audio information in the one direction.

17. The device of claim 15, wherein the one direction comprises a direction of communication from the device to the other device.

18. The device of claim 17, wherein:
the first audio information comprises first voice information associated with a first user;
the first video information comprises a video clip unrelated to the first audio information;
the second audio information comprises second voice information associated with a second user; and
the second video information comprises video associated with the second audio information.

19. The device of claim 15, wherein the command comprises a synchronization attribute command in a protocol substantially conforming to a third generation partnership project technical specification 26.114 (3GPP TS26.114).

20. The device of claim 15, wherein the device comprises at least one of:
a wireless communication device handset; and
an integrated circuit.

21. A device for communicating audio and video information, comprising:
a control unit that generates a command to disable synchronization of video information and audio information in only one direction of a bi-directional communication;
a transmitter that:
sends the command to another device; and
sends first audio information and first video information to the another device, wherein synchronization is enabled for the first audio information and the video information; and
a receiver that receives second audio information and second video information from the another device, wherein synchronization is disabled for the second audio information and the second video information.

22. The device of claim 21, wherein:
the first audio information comprises first voice information associated with a first user;
the first video information comprises video associated with the first audio information;
the second audio information comprises second voice information associated with a second user; and
the second video information comprises a video clip unrelated to the second audio information.

23. A device for communicating audio and video information, comprising:
a control unit that disables synchronization of video information and audio information in one direction in response to receiving a command to disable synchronization of video information and audio information in only one direction of a bi-directional communication from another device;
a receiver that:
receives the command from the another device; and
receives first audio information and first video information from the another device, wherein synchronization is disabled for the first audio information and the first video information; and
a transmitter that sends second audio information and second video information to the another device, wherein synchronization is enabled for the second audio information and the second video information.

24. A system comprising:
a packet-based network;
a first device coupled to the packet-based network; and
a second device coupled to the packet-based network, wherein the first device and the second device are communicatively coupled to one another for bi-directional communication through the packet-based network, and wherein:
the first device generates a command to disable synchronization of video information and audio information in only one direction of the bi-directional communication, and sends the command to the second device, and
the second device:
receives the command;
disables synchronization of video information and audio information in the one direction in response to receiving the command;
receives first audio information and first video information from the first device, wherein synchronization is disabled for the first audio information and the first video information; and
sends second audio information and second video information to the first device, wherein synchronization is enabled for the second audio information and the second video information.

25. The system of claim 24, wherein the second device sends an acknowledgement to the first device, and in response to the acknowledgement, the first device disables synchronization of video information and audio information in the one direction.

26. A device for communicating audio and video information, comprising:
means for generating a command to disable synchronization of video information and audio information in only one direction of a bi-directional communication between the device and another device;
means for:
sending the command to the other device; and sending first audio information and first video information to the another device, wherein synchronization is disabled for the first audio information and the first video information; and means for receiving second audio information and second video information from the another device, wherein synchronization is enabled for the second audio information and the second video information.

27. The device of claim 26, wherein the means for receiving further receives an acknowledgement of the command from the other device indicating that the other device has disabled synchronization of video information and audio information in one direction.

28. A non-transitory computer-readable medium storing code for causing a computer to communicate video information and audio information with another device, comprising:

code for causing the computer to generate a command to disable synchronization of video information and audio information in only one direction of a bi-directional communication between the computer and the device;

code for causing the computer to send the command to the device;

code for causing the computer to send first audio information and first video information to the device, wherein synchronization is disabled for the first audio information and the first video information; and code for configuring the computer to receive second audio information and second video information from the device, wherein synchronization is enabled for the second audio information and the second video information.

29. The non-transitory computer-readable medium storing code according to claim 28, further comprising code for configuring the computer to receive an acknowledgement of the command from the device indicating that the device has disabled synchronization of video information and audio information in one direction.

* * * * *